July 20, 1943. A. F. ROBERTSON 2,324,879
TOOL FOR CUTTING THREADS
Filed June 29, 1942 4 Sheets-Sheet 3
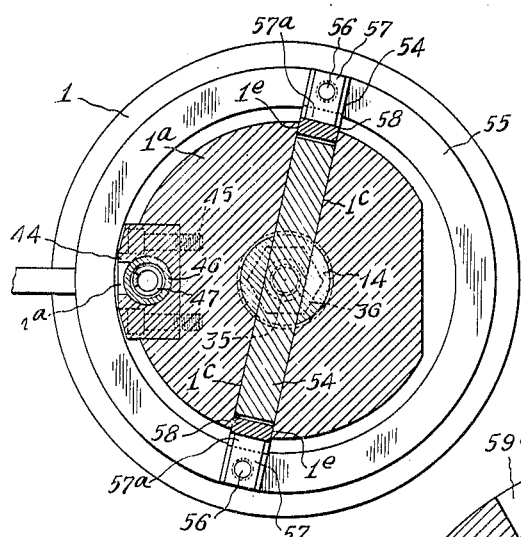
FIG. 7
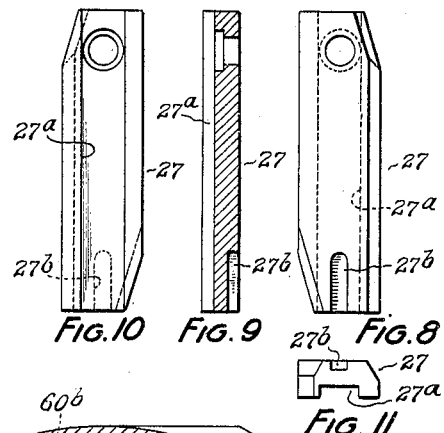
FIG. 10  FIG. 9  FIG. 8
FIG. 11
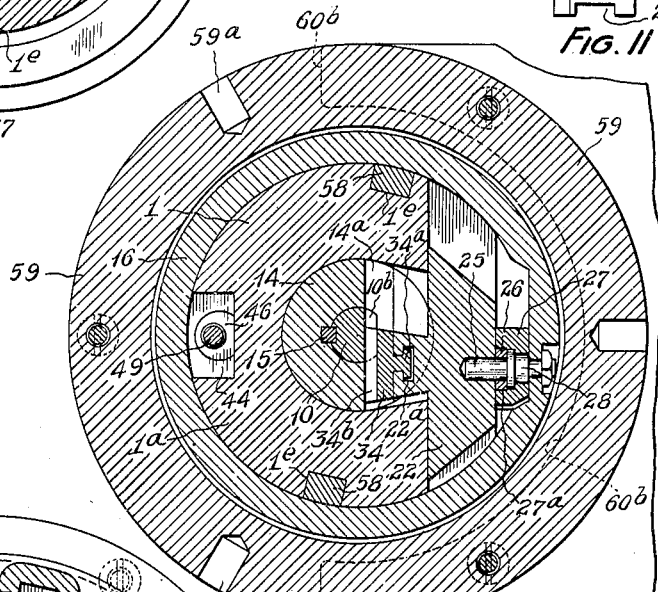
FIG. 6
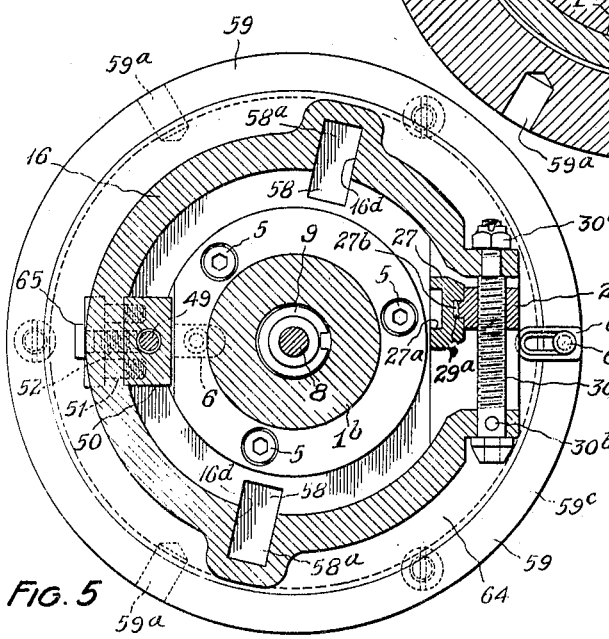
FIG. 5
INVENTOR:
A. F. Robertson
BY Ray S. Gehr
ATTORNEY.

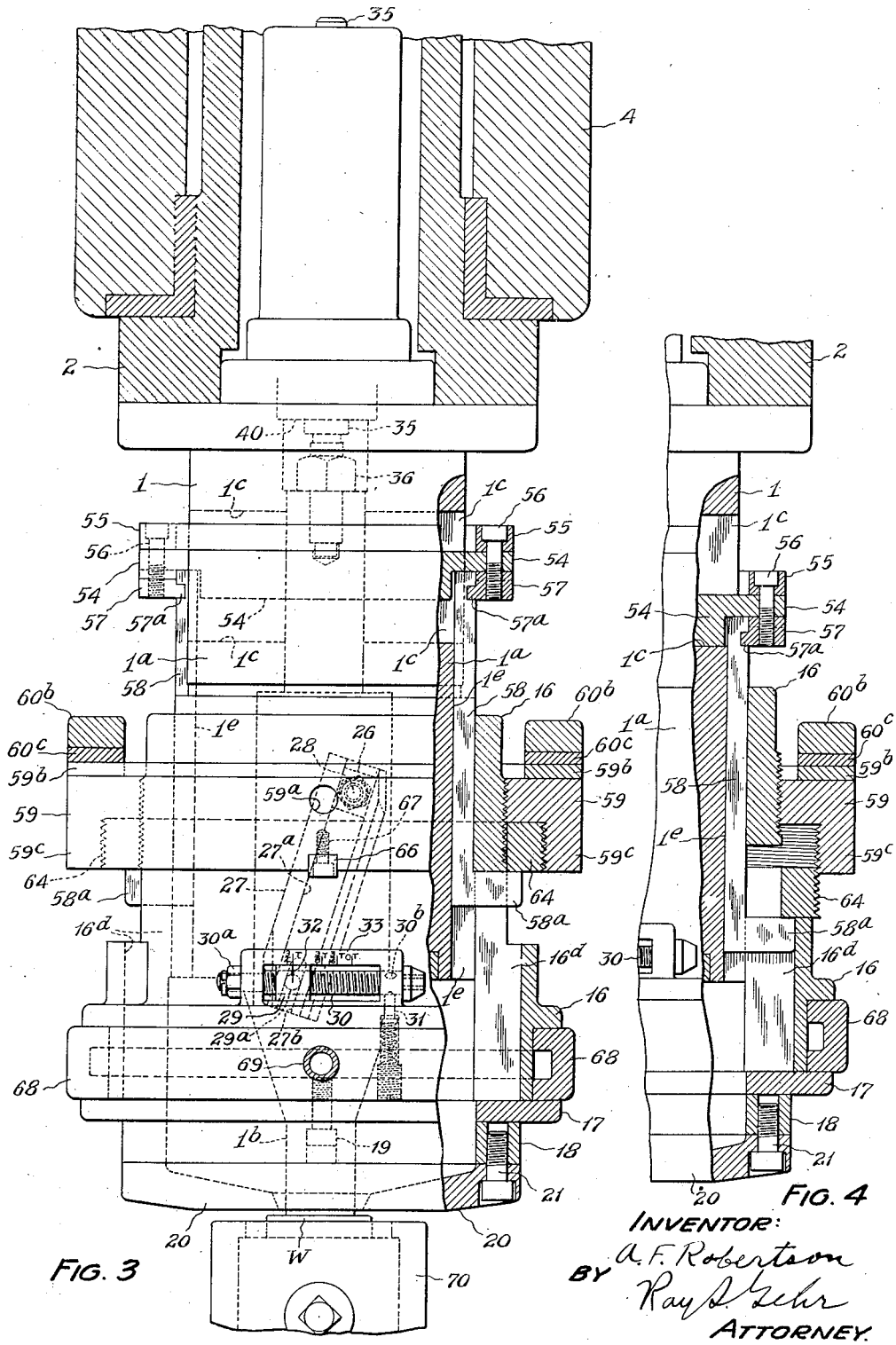

INVENTOR:
A. F. Robertson
BY Ray L. Gehr
ATTORNEY.

Patented July 20, 1943

2,324,879

UNITED STATES PATENT OFFICE 2,324,879

TOOL FOR CUTTING THREADS

Alexander F. Robertson, South Euclid, Ohio, assignor to The Pipe Machinery Company, Cleveland, Ohio, a corporation of Ohio Application June 29, 1942, Serial No. 448,935

14 Claims. (Cl. 10—145)

This invention relates to thread-cutting tools of the type having cutters or chasers which are movably mounted to be retracted in the operation of the tool and form taper threads.

The invention has for one of its objects the provision of a tool with receding and/or collapsing chasers which is adapted to cut internal taper threads of small diameter and which has improved facilities for the removal and insertion of the cutters.

Another object of the invention is the provision, in a tap of the receding chaser type, of means for varying the taper of the threads cut characterized by accuracy of operation, simplicity of construction and great ease of adjustment.

A further object of the invention is the provision of a thread-cutting tap having improved means for supplying liquid lubricant to the chasers and work during the operation of the tool.

Another object of the invention is the provision of a tool in which the above objects are realized and which is relatively compact, has a symmetrical, clean cut and pleasing form and which is easily operated, adjusted and serviced.

Other objects, more or less ancillary or incidental to those above noted, will be apparent as this description proceeds.

With the stated objects in view, the invention consists in certain constructions, arrangements and combinations of parts which are exemplified in a preferred embodiment of the invention shown in the accompanying drawings.

In the drawings,

Fig. 3 is an elevation of the right side of the apparatus as shown in Fig. 1 with a portion of the structure shown in section to disclose internal construction.

Fig. 4 is a fragmentary view corresponding to Fig. 3 but with parts of the tool moved into the positions occupied when the cutters are freed for removal.

Fig. 5 is a horizontal section on the line 5—5 of Fig. 1.

Fig. 6 is a horizontal section on the line 6—6 of Fig. 1.

Fig. 7 is a horizontal section on the line 7—7 of Fig. 1.

Figs. 8, 9, 10 and 11 are an outside elevation, a vertical section, an inside elevation, and a forward end view, respectively, of one of the cam parts of the tool.

Figures 1, 2:
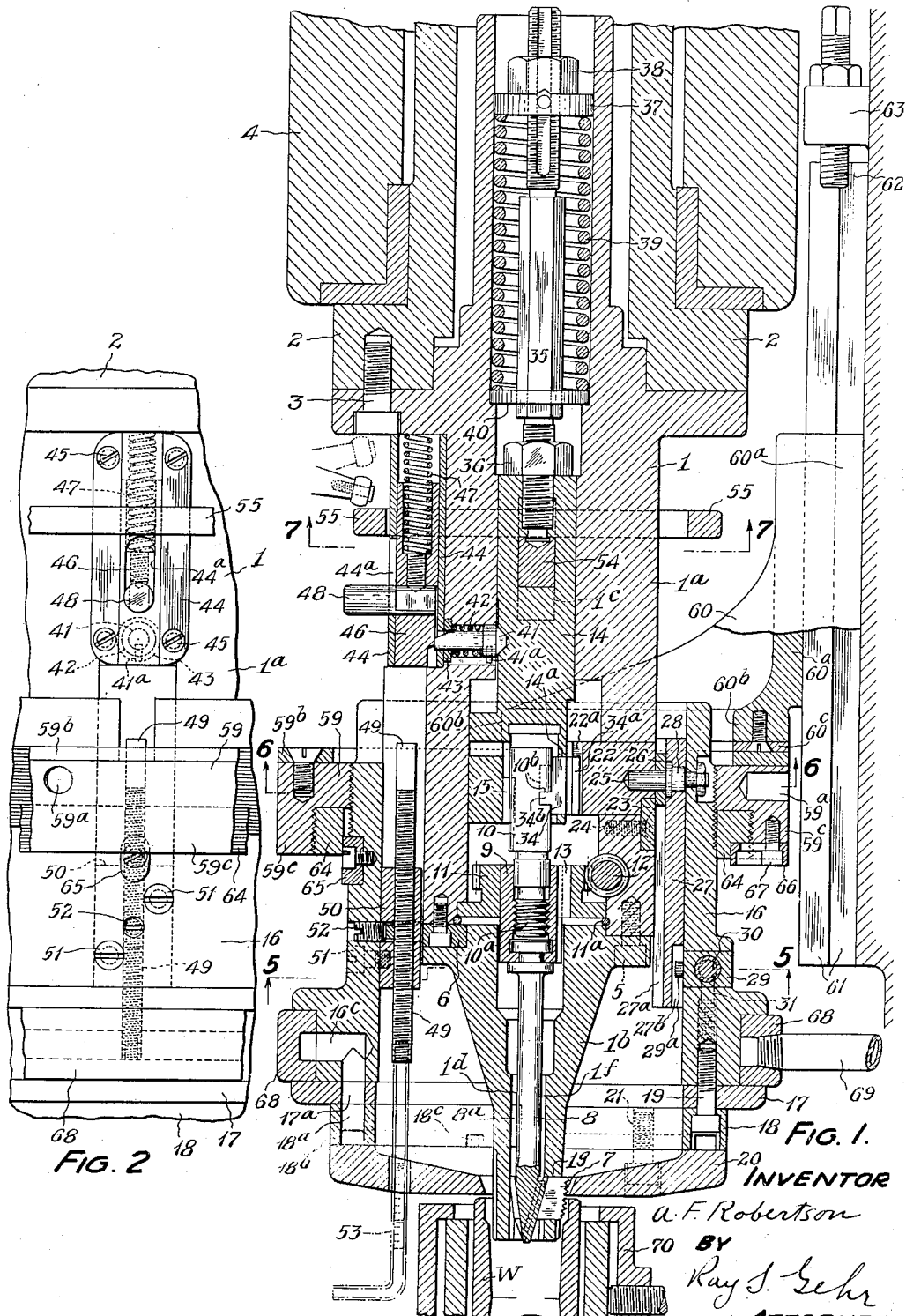
Fig. 1 is a vertical axial section of a tool which embodies the invention.
Fig. 2 is a fragmentary elevation of the left side of the apparatus as shown in Fig. 1.

The tool illustrated in the drawings is in a number of respects similar to the tool disclosed in United States Patent 2,265,764, granted December 9, 1941, to which reference may be made for some features of construction there shown and described in greater detail.

The tool embodying the present invention may be arranged either horizontally or vertically but in the preferred form illustrated in the drawings it is vertically arranged. It comprises a tool body 1 secured to a motor-driven spindle 2 by means of screws 3. The spindle 2 is rotatably mounted in a spindle housing 4 which is intended to be vertically reciprocated by any suitable lead screw mechanism (not shown). The tool body 1 comprises a main part $1^a$ and a nose or head $1^b$ detachably secured to the forward end of the main part $1^a$ by means of screws 5 and key 6.

Figures 12, 13, 14, 15:
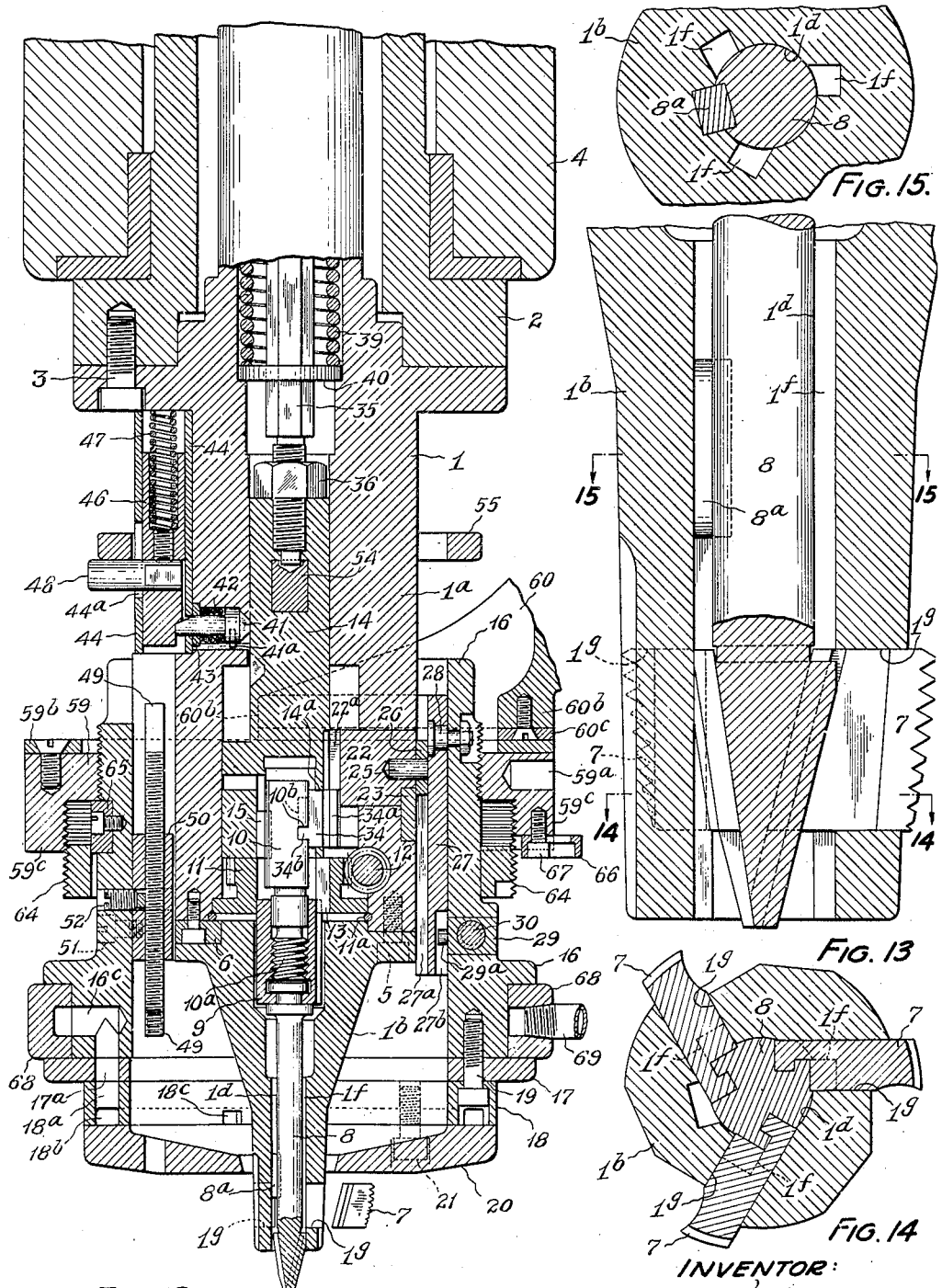
Fig. 12 is a vertical axial section similar to Fig. 1 but with the parts of the tool in the positions they occupy when the cutters are freed for removal, and corresponding to the positions of the parts shown in Fig. 4.
Fig. 13 is a fragmentary enlarged axial section showing the forward end of the tool body, the cutters and cutter-actuating means.
Fig. 14 is a section on the line 14—14 of Fig. 13.
Fig. 15 is a section on the line 15—15 of Fig. 13.

The tool body is of tubular or hollow construction and the forward end of the nose $1^b$ is contracted to small diameter and has its bore $1^d$ formed with a plurality of longitudinal grooves $1^f$. Nose $1^b$ is also formed with a plurality of rectangular apertures $1^g$ aligned with the grooves $1^f$, and in each aperture is slidably fitted a chaser or cutter 7. Within the tool body is disposed an inner slide structure composed of parts 8, 9 and 10. The part 8 is slidably mounted in and guided by the bore $1^d$ and is forwardly tapered at its forward end and formed with tongues and grooves to cooperate with complementary grooves and tongues formed on the inner sides of the chasers 7, as is best shown in Figs. 13 and 14. With this cam connection between the chasers 7 and the slide member 8, axial movement of the latter relative to the chasers serves to move the chasers, such movement being inward when the member 8 is drawn rearward and outward when the member 8 is moved forward.

The slide member 8 is somewhat enlarged at its forward end and has cylindrical surfaces which slidably engage the bore $1^d$ of the nose $1^b$. As indicated by Figs. 13, 14 and 15, the grooves $1^f$ of nose $1^b$ accommodate the outwardly extending cam parts of member 8. The latter member is held against rotation by a key or spline 8ᵃ (Figs. 13 and 15).

The hollow slide member 9 has a swivel connection at its forward end to the rear end of the member 8 and is formed with internal screw threads to engage the threaded forward end 10ᵃ of the slide member 10. The member 9 is slidably supported in a worm wheel 11 which is rotatably supported in the bore of the body 1 and operatively secured in position by a snap ring 11ᵃ. A worm 12 is rotatably mounted in the tool body 1 to cooperate with and turn the worm wheel 11, the latter being connected by a spline 13 to rotate the slide member 9.

The slide member 10 is slidably supported in the axial bore of an abutment member 14 which in turn is axially slidable in the bore of the tool body 1, the member 10 being secured by a spline 15 against rotation relative to the abutment 14.

On the outer surface of the tool body 1 is mounted an outer slide structure which comprises a main sleeve-like member 16 which slidably engages the tool body, annular members 17 and 18 which are secured to the forward end of member 16 by screws 19 and a front work-engaging pressure plate 20 which is secured to the annular member 18 by screws 21. Pressure plate 20 is centrally apertured to accommodate the front end of the nose 1ᵇ and the chasers 7.

Taper mechanism

In the operation of the tool the outer slide structure engages the work to be threaded so that as the tool body is advanced toward the work the outer slide structure is given a rearward movement in relation to the tool body. This relative movement is utilized to effect a corresponding rearward movement of the inner slide structure relative to the tool body and thus effect a receding movement of the chasers to cut a thread in taper form.

In accordance with the present invention new and improved operative connections are provided between the outer and inner slide structures as follows. Interposed between the inner and outer slides is a member 22 slidably mounted in the tool body for movement transversely of the tool body on cordal lines (Figs. 1 and 6). The transverse slide 22 is operatively secured in position by a plate or block 23 which is attached to the tool body by screw 24. The slidably mounted member 22 is operatively connected to the outer slide structure to be moved thereby and is also operatively connected to the inner slide to effect axial movement thereof during the thread-cutting operation with resultant tapering of the thread formed, the amount of the axial movement of the inner slide relative to the tool body determining the amount of the thread taper. Referring to the first of the said connections, slide 22 carries a pin 25 which projects from the side of the tool body and supports an annular block or shoe 26 arranged to cooperate with a cam plate 27 which has its rear end pivotally connected to slide member 16 by a specially formed shoulder bolt 28. On its inner side the cam plate 27 is formed with a longitudinally-extending cam groove 27ᵃ designed to embrace and, when the outer slide is moved endwise of the tool, to move the block 26 and the slide 22 to which the block is attached.

The amount of transverse movement given to the slide 22 by the cam plate 27 depends upon the angular adjustment of the cam plate on its pivotal support 28. Such angular adjustment is effected and maintained by a block 29 which is slidably mounted in outer slide member 16 (Figs. 1 and 5) and which is actuated by a screw 30 rotatably secured in slide member 16 by its integral head and a nut 30ᵃ, said screw having its threads operatively engaging a threaded aperture in the block 29. The block 29 is formed on its inner side with a projecting pin 29ᵃ which operatively engages a slot 27ᵇ formed in the outer side of the cam plate 27 at the forward end thereof. The head of the screw 30 is formed with a socket to receive a wrench for rotating the screw to effect the adjustment of the cam plate 27. Preferably the screw 30 is formed adjacent its head with several depressions or sockets 30ᵇ to be engaged by a spring pressed detent 31 (Fig. 3) to hold the screw yieldingly in the adjusted positions. However, friction may be relied upon to hold the screw in adjusted position, particularly as the block 27 and screw 30 constitute a non-overhauling device for adjusting and holding the cam plate 27. The adjusting block 29 is provided on its outer face with a reference mark 32 designed to cooperate with an adjacent graduated scale 33 formed on the slide member 16. This scale 33 may, as shown, include characters indicating different thread tapers which the tool is adapted to form when the reference mark of the adjusting nut 29 is moved opposite the respective characters. Thus, as shown in Fig. 3, we have zero taper (or straight thread) when the cam groove 27ᵃ is parallel to the tool axis and various other tapers as the forward end of the cam plate 27 is adjusted to the left from the zero position.

The connection, previously referred to, between the member 22 and the inner slide structure comprises a cam member 34 which has a tongue 34ᵃ T-shaped in cross section slidably engaging a similarly shaped channel 22ᵃ in the inner side of slide 22. On its inner side the cam member 34 is formed with a cam tongue 34ᵇ which is inclined to a plane at right angles to the axis of the tool and engages a similarly inclined groove or slot 10ᵇ in the inner slide member 10 (Figs. 1 and 6). The cam member 34 is mounted to slide in a transverse slot 14ᵃ formed in the abutment 14 so that transverse movement of the cam 34 with the transverse slide 22 will effect axial movement of the inner slide structure comprising the parts 8, 9 and 10 and thus determine inward or outward movement of the cutters 7. From a consideration of the inclinations of the cam grooves in the plate 27 and in the inner slide member 10 (with plate 27 adjusted as shown in Fig. 3), it will be seen that forward movement of the tool body 1 relative to the work and the work-engaging outer slide will cause a rearward movement of the inner slide in relation to the tool body 1. This gradual rearward movement of the inner slide during the thread-cutting operation causes a corresponding retraction or receding of the chasers, with resultant taper of the thread.

Chaser-collapsing mechanism

The abutment 14 is provided with a rearward extension in the form of a rod 35 which is threaded at its front end to engage a threaded hole in the rear end of abutment 14 in which it is adjustably secured by the lock nut 36. The rear end of the rod 35 carries a collar 37 which is secured by a nut 38 on the threaded rear end of the rod. A helical spring 39 surrounds the rod with its rear end abutting the collar 37 and its front end against a collar 40 which in turn abuts against a shoulder in the bore of the tool body 1. Thus the spring 39 serves constantly to urge the abutment 14 rearward in the bore of the tool body.

The spring 39 is normally prevented from moving the abutment 14 by a holding device or latch 41 which is slidably mounted in a radial hole in the tool body 1 and engages a notch in the abutment 14. The latch 41 is secured against rotation by a pin 41$^a$ which slidably engages a groove in the tool body 1 as shown in Fig. 1. The latch 41 is pressed into engagement with the abutment 14 by a relatively light helical spring 42 which surrounds the stem of the latch and abuts against a collar 43 which is secured in position by a block 44 that is in turn secured by screws 45 to the tool body 1. The latch 41 and the notch of the abutment 14 at their front sides are inclined to the axis of the tool so that the pressure of the large spring 39 tends to move the latch 41 outward against the tension of the light spring 42 to a disengaged position. Such movement of the latch 41 is prevented by a keeper bolt 46 which is slidably mounted in a hole drilled in the block 44. A helical spring 47 normally presses bolt 46 forward to overlie the end of the latch 41. Bolt 46 carries a pin 48 which may be grasped to manually operate the bolt. Pin 48 projects outward through a slot 44$^a$ in the block 44 and the engagement of the pin 48 with the forward end of this slot limits the forward movement of the bolt 46 by the spring 47. With the bolt 46 in its forward position the latch cannot be disengaged, but when the bolt is moved rearward it releases the latch 41 to permit its disengagement.

Automatic disengagement of latch 41 is effected by a rod 49 adjustably mounted on the outer slide in line with the bolt 46. The rod 49 is formed with screw threads engaging the threaded hole of a block 50 which is secured by screws 51 to the outer slide member 16. The front end of the rod 49 is formed with a socket to receive a wrench indicated by dot-and-dash lines at 53, the pressure plate 20 being apertured to permit entrance of such wrench to effect adjustment of the rod 49. A set screw 52 is provided to secure the rod in adjusted position. When the rod is suitably adjusted, its rear end is caused to contact the bolt 46 as the thread-cutting operation nears its end. Then, as the relative rearward movement of the outer slide continues, the bolt or keeper 46 is moved out of engagement with the latch 41 and the latter is forced outward to an inoperative position by the force of the large coil spring 39 whereupon the said spring effects the rapid retraction of the abutment 14 and such movement of the abutment carries with it the inner slide members 10, 9 and 8 with resultant inward collapse of the chasers 7.

Resetting mechanism

When the cutters have been collapsed in the manner explained at the end of a threading operation, it is necessary to reset the tool for a succeeding operation by restoring the movable abutment 14 to its forward latched position. The means for accomplishing this will now be described. A transverse bar 54 is mounted in a transverse aperture in the abutment 14 with the ends of the bar extending radially outward through slots 1$^c$, 1$^c$ in the wall of the tool body 1. A ring 55 is secured to the ends of bar 54 (Fig. 3) by screws 56 and blocks 57, said blocks having inwardly-extending lugs 57$^a$. Each of these lugs engages the notched rear end of a tension rod or bar 58 which is square or rectangular in cross section and slidably fits a longitudinal slot 1$^e$ in the tool body 1. Each of the bars 58 has a forward outturned end 58$^a$ which extends through a slot 16$^d$ in the outer slide member 16. There is thus formed a connection between the transverse bar 54 and the slide member 16 by means of which the abutment 14 can be given relative forward movement in the tool body by causing a relative forward movement of the outer slide on the tool body. The bars 58 also serve as keys to prevent rotation of the slide member 16 relative to the tool body.

To provide for the movement of the outer slide to effect resetting of the tool, the slide member 16 is fitted with a ring 59 which is internally threaded to engage external threads on the slide member 16 and has one or more wrench sockets 59$^a$ to facilitate turning it on said slide member. The apparatus is provided with stop devices to cooperate with ring 59, said devices comprising a yoke 60 having slide parts 60$^a$, 60$^a$ which engage ways 61, 61 carried by a frame part of the apparatus. The yoke 60 is formed at its forward end with a semicircular part 60$^b$ which is of the same radius as the ring 59 and adapted to engage the rear side of said ring, the cooperating faces of the ring and yoke parts being fitted with hardened wear plates 59$^b$ and 60$^c$, respectively. The weight of the yoke 60 is sustained by the ring 59 and the yoke moves freely up and down in the ways 61 with the upward and downward movement of the outer slide of the tool. However, the upward movement of the yoke 60 is limited by an adjustable stop in the form of a screw 62 mounted in a lug or bracket 63 carried by the frame of the apparatus, so that when, following the thread-cutting operation, the tool body is retracted, the rearward movement of the outer slide of the tool is stopped and with it the bars 58, cross bar 54 and abutment 14, with the result that the continued retraction of the tool body effects the resetting of the tool.

Facilities for removing chasers

The ring 59 is normally secured against rotation relative to the slide member 16. Said ring has a forwardly-extending flange part 59$^c$ which is internally threaded to receive an externally-threaded ring 64 which is secured against rotation relative to slide member 16 by a key 65. In turn the ring 59 is normally locked to the ring 64 by a key 66 secured by a screw 67 to the ring 59. However, the key 66 is slotted so that by loosening the screw 67 the key can be moved radially outward and disengaged from the ring 64 to permit relative rotation of said ring and the ring 59. The screw threads connecting the ring 59 and the ring 64 are of greater pitch than the threads connecting the ring 59 and the slide member 16, and one of the two sets of threads is made left hand while the other is made right hand. Thus in the tool illustrated the threads connecting the ring 59 to member 16 are made left hand and 12 turns to the inch while the threads connecting rings 59 and 64 are right hand and 8 turns to the inch. The manner in which these threaded connections function to facilitate removal of the chasers will be explained in connection with the description to follow of the operation of the tool.

Lubricating means

To feed liquid lubricant or coolant to the cutters during the threading operation the forward end of the outer slide member 16, which is continuous circumferentially, is provided with a channeled ring 68 to which is attached a pipe 69 through which the liquid may be fed in well known manner. The ring 68 is clamped in position by the slide ring 17 and the slide members 16, 17 and 18 are formed with a plurality of sets of passages 16c, 17a and 18a, respectively, the last named passage communicating with an annular channel 18b formed in ring 18 and from this channel 18b the liquid is discharged through one or more apertures 18c against the cutters. As will be apparent, the liquid-conducting channels and passages are readily formed in the respective parts as described and the delivery of the lubricating or cooling fluid to the cutters is accomplished with a minimum of complication.

The numeral 70 designates as an entirety a clamp device for holding the work to be threaded, such work being indicated at W as a pipe coupling.

Operation

In the operation of the tool mechanism already described, power control devices either of the manual type or of the partially or fully automatic type may be employed to effect the starting and stopping of the rotational movement of the spindle and the advance and retraction of the spindle housing. These control devices have not been shown in the drawings and need not be described as any suitable forms of known control devices may be employed in the operation of the tool.

In placing the tool in operation it is first adjusted to provide for the specific taper, length and diameter of thread to be cut. Adjustment for the taper desired is effected easily and quickly by rotating the screw 30 to adjust the cam plate 27 on its pivotal support to the proper angular position. Such adjustment requires merely the application of a suitable wrench to the head of the screw 30, there being no part or parts to be removed or interchanged or disengaged and the entire operation consisting in the mere rotation of the adjusting screw, the block 29 and screw 30 constituting a non-overhauling or self-locking device, as previously stated.

Next the diameter of the thread may be fixed by rotation of the worm 12 to turn the worm wheel 11 and effect a forward or rearward adjustment of the inner slide members 8 and 9, such rotation of the worm being effected by inserting a suitable wrench or tool through an aperture (not shown) in the slide member 16 in the manner described in the aforesaid Patent No. 2,265,764.

Finally, the adjustment for the length of the thread to be cut is effected by adjusting the threaded rod 49, this adjustment being made by the use of the wrench 53, the graduation of which in connection with the face of the pressure plate 20 serving to indicate the desired position of rod 49.

Assuming that the adjustments have been made and that the working parts of the tool are in the positions shown in Fig. 1 with the chasers 7 in their expanded positions and both the inner slide and the outer slide in their forward positions on the tool body with the abutment 14 latched in its forward position in the tool, then upon the rotation and forward feeding of the machine spindle and the tool body, the chasers 7 and the pressure plate 20 are brought into engagement with the rear end of the coupling W, whereupon the forward movement of the outer slide structure is stopped and the continued forward feeding of the tool results in the advance of the tool body 1 in relation to the outer slide structure, which is equivalent to a rearward movement of the outer slide in relation to the tool body. This movement causes the cam plate 27 to move the slide 22 transversely of the tool body and with it the cam 34. Such movement of the cam 34 in turn effects a rearward movement of the inner slide members 10, 9 and 8 which in turn effects a corresponding gradually receding movement of the chasers 7 with a resultant taper of the thread formed by the chasers.

As the end of the thread-cutting operation is approached, the rod 49 and the bolt or keeper 46 come into mutual engagement whereupon further advance of the tool body effects a rearward movement of said bolt in relation to the latch 41 until the bolt 46 is disengaged from the latch 41. Then the force of the spring 39 acting through the abutment 14 forces the latch 41 outward to an inoperative position and the abutment 14 then is moved quickly rearward by the spring 39. This movement of the abutment carries with it the cam 34 and also the inner slide members 10, 9 and 8 so that at the end of the thread-forming operation the cutters suddenly are fully collapsed. The rapid movement of the inner slide is permitted by the T-shape tongue and groove connection between the cam 34 and the transverse slide 22 and such movement is accomplished without disturbing the operative connection beween the outer and inner slides.

Upon the collapse of the chasers the feed of the machine is reversed by control mechanism actuated by the ring 55, and the tool is retracted away from the work, the yoke 60 then being carried rearward in its supporting ways 61 until it engages the stop screw 62 whereupon rearward movement of the outer slide of the tool is stopped, and since the outer slide is connected by the rods 58 with the transverse bar 54 and abutment 14 the latter parts, together with the inner slide members 10, 9 and 8, are also stopped in their rearward movement. Consequently as the rearward movement of the tool body continues the abutment 14 and the inner slide members are given a relative forward movement in the tool body against the opposing pressure of spring 39 and the abutment 14 is thus restored to its latched position as shown in Fig. 1 and the chasers 7 are again expanded and made ready for a new cutting operation.

The preceding description of the operation has reference to the cutting of taper threads. When straight threads are to be cut, it is only necessary to adjust the cam plate 27 to the zero taper position by rotation of screw 30 to adapt the tool for that purpose. That adjustment brings the groove 27a of plate 27 parallel to the tool axis so that mutual relative movement of the tool body and outer slide causes no axial movement of the inner slide relative to the tool body during the thread-cutting operation and no gradual receding of the chasers is effected, although at the end of the cutting operation the abutment 14 is unlatched and rapidly retracted to effect the rapid collapse of the chasers, as previously described. Thus, by the easily effected adjustment of cam plate 27 the tool may be quickly converted from an automatically receding and collapsing tap for the cutting of taper threads to a collapsing tap for cutting straight threads, and vice versa.

As will readily be understood the chasers can be collapsed at any time desired by the operator by manual movement of the pin 48 to permit disengagement of the latch 41. Also it will be apparent that the chasers can be reset to their expanded position by grasping the ring 55 and forcing it forward relative to the tool body.

In taps of the receding and/or collapsing chaser type it has been customary to slidably mount the chasers in notches formed in the forward end of the tool body, such notches being closed at their forward ends by a removable ring which holds the chasers against axial movement. This removable ring is usually secured to the tool body by means of screws and the annular front wall of the tool body must be thick enough to accommdate the shanks of screws of adequate size and strength. This consideration makes it possible to reduce the nose of the tool body in diameter to the extent which is desirable for the cutting of small diameter threads. Consequently in the present invention it has been sought to mount the chasers in rectangular apertures formed in the wall of the tool body nose so that a front securing ring is not required and so that the thickness of the wall of the nose can be minimized. However, when the chasers are mounted in this manner it is not possible, because of their interlocking connection with the forward member of the inner slide, to remove them one at a time, as can be done where a front securing ring is employed. Consequently if the tool body nose is made small in diameter and the tapered end of the inner slide member 8 is made correspondingly small in diameter (as it must be), it becomes impossible to disengage all of the chasers from the inner slide member 8 by retracting the latter, because as the member 8 is moved rearward the inner edges of the chasers 7 go into interference with each other before the tapered end or cone of member 8 can be fully disengaged from the chasers.

Thus the provision of a tap with receding or collapsing chasers capable of cutting threads of quite small diameter has heretofore presented a problem for which there was no satisfactory solution.

According to the present invention this problem is solved by the provision of novel means for moving the inner slide forward in the tool body and for moving the outer slide rearward on the tool body so that the chasers are disengaged from the inner slide and are freed for removal from the nose of the tool body without interference by the work-engaging part of the outer slide. Furthermore, this result is accomplished without disconnecting the connections between the inner and outer slides of the tool or in any way interferring with or disturbing the adjustments of the tool which determine the diameter, length and taper of the threads cut. The structural means for accomplishing this result have already been described and the way in which they function will now be explained.

When it is desired to remove the chasers from the nose of the tool body, the tool body is retracted until the yoke 60 is brought into contact with the abutment 62 and is then stopped. The key 66 is then disengaged from the ring 64 and the ring 59 is rotated on the slide member 16 in a direction which would cause the ring to travel rearward on the said slide member if such movement were not prevented by the yoke 60 and abutment 62. Because of the reaction of the yoke 60 on the ring 59 the rotation of the latter on the slide member 16 causes said slide member to move rearward on the tool body. Simultaneously the rotation of the ring 59 causes the nonrotatable ring 64 to move forward and in such movement the ring 64 carries forward with it the bars 58 and they in turn advance the transverse bar 54, the abutment 14 and the inner slide members, in relation to the tool body and against the tension of the spring 39. These respective movements continue until the parts of the tool reach the relative positions shown in Fig. 12 where the tapered end or cone of the inner slide member 8 is advanced far enough to fully disengage the chasers 7 while the outer slide is retracted far enough to fully uncover the said chasers and permit them to be drawn outward from their respective apertures in the nose of the tool body.

The chasers, being thus disengaged, can be inspected, or ground or replaced by new ones. Then, with chasers again positioned in nose 1b, a rotation of the ring 59 in a direction opposite to that in which it was first rotated will permit the pressure of spring 39 to return the various tool parts to their normal positions shown in Fig. 1. The key 66 may then be restored to its locking position and the tool is again ready for use.

It will be seen that the removal of the chasers in the manner described does not in any way interfere with any of the adjustments of the tool which establish the diameter, length and taper of the thread formed by the tool. Nor does such removal of the chasers require or involve any disassembly of the tool mechanism, other than the removal of the chasers themselves.

The novel features of the present invention are not only advantageous individually but also are interrelated in a manner giving them added value, as will be appreciated by those familiar with the various fields of thread-cutting work. It has been pointed out in the foregoing description that the improved tool, while well adapted to cut threads of various tapers, can also be adapted, by the very simple adjustment of the cam plate 27, to cut straight threads. Thus the tool not only provides the advantages of automatically receding and/or collapsing chasers for cutting taper threads of very small diameter but also, by reason of its improved means for easily varying the taper of the threads cut from zero upwards, is admirably adapted for the large volume work of cutting straight threads of small diameter.

While a preferred embodiment of the invention has been shown and described it will be understood that the apparatus disclosed can be modified in a variety of ways by the substitution of equivalents without departing from the invention as defined in the appended claims.

What is claimed is:

1. In apparatus for cutting internal threads comprising a hollow tool body operatively mounted for axial and rotational movement and having a forward nose or head part; a plurality of chasers slidably mounted for inward and outward movement in the wall of the nose part of the tool body; an inner slide structure mounted for axial movement in the tool body and operatively connected to the chasers to effect their inward movement when said inner slide moves rearward in the tool body and their outward movement when the slide moves in the opposite direction; an outer slide structure mounted for axial movement on the tool body and comprising a work-engaging part, whereby said slide structure is moved rearward relative to the tool body when the tool body is advanced relative to the work; and means controlled by the movement of the outer slide relative to the tool body for moving the inner slide lengthwise of the tool body and correspondingly moving the chasers in their supporting apertures; the combination therewith of actuating devices operatively associated with the inner slide and the outer slide for moving the former forward and the latter rearward to disengage the inner slide from the chasers and permit outward removal of the chasers without interference by the work-engaging part of the outer slide.

2. In apparatus for cutting internal taper threads comprising a hollow tool body operatively mounted for axial and rotational movement and having a forward nose or head part; a plurality of chasers slidably mounted for inward and outward movement in the wall of the nose part of the tool body; an inner slide structure mounted for axial movement in the tool body and operatively connected to the chasers to effect their inward movement when said inner slide moves rearward in the tool body and their outward movement when the slide moves in the opposite direction; an outer slide structure mounted for axial movement on the tool body and comprising a work-engaging part, whereby said slide structure is moved rearward relative to the tool body when the tool body is advanced relative to the work; and operative connections between the inner and outer slide structures for transmitting axial movement of the outer slide relative to the tool body to the inner slide to effect movement of the latter in the same direction as the movement of the outer slide and in a predetermined ratio thereto, said operative connections permitting axial movement of the inner slide in the tool body without transmission of such movement to the outer slide; the combination therewith of actuating devices associated with the inner slide and the outer slide and operable without interrupting said operative connections to move the inner slide forward and the outer slide rearward and disengage the inner slide from the chasers and permit outward removal of the chasers without interference by the work-engaging part of the outer slide.

3. Apparatus for cutting internal threads as claimed in claim 1 in which the means for moving the inner slide lengthwise of the tool body comprises a movably-mounted abutment operatively connected to the inner slide, a spring for moving said abutment, a latch for holding the abutment against movement by the spring, and means for disengaging the latch at the end of the thread-cutting operation of the tool to effect rapid movement of the abutment and collapse of the chasers.

4. Apparatus for cutting internal threads as claimed in claim 1 in which the said actuating devices for moving the inner slide forward and the outer side rearward are operable manually.

5. Apparatus for cutting internal threads as claimed in claim 1 in which the said actuating devices for moving the inner slide forward and the outer slide rearward comprise a movable actuating member, an abutment therefor, and operative connections between the actuating member and the outer and inner slides, respectively, for moving the inner slide forward and the outer slide rearward when the actuating member is moved.

6. Apparatus for cutting internal threads as claimed in claim 1 in which the said actuating devices for moving the inner slide forward and the outer slide rearward comprise an actuating member, an abutment therefor, and operative connections between the actuating member and the inner and outer slides comprising a screw thread on the actuating member connected to actuate the inner slide and an opposite screw thread of smaller pitch on the actuating member connected to actuate the outer slide.

7. Apparatus for cutting internal threads as claimed in claim 1 in which the operative connections between the inner and outer slides comprise a movably mounted abutment designed to move the inner slide axially without axial movement of the outer slide and in which the devices for moving the inner slide forward and the outer slide rearward effect such movement of the inner slide by movement of the said movably mounted abutment.

8. Apparatus for cutting internal threads as claimed in claim 1 in which the actuating devices for moving the inner slide forward and the outer slide rearward comprise an abutment, an annular actuating member arranged to operatively engage said abutment and having a screw thread engaging a mating screw thread on the outer slide and also having an opposite screw thread of greater pitch, a second annular member keyed to move axially on the outer slide and having a screw thread mating with the last mentioned screw thread of the actuating member, and an operative connection between the second annular member and the inner slide.

9. Apparatus for cutting internal taper threads as claimed in claim 2 in which the operative connections between the inner and outer slides comprise a movably mounted abutment designed to move the inner slide axially without axial movement of the outer slide and in which the devices for moving the inner slide forward and the outer slide rearward effect such movement of the inner slide by movement of said movably mounted abutment, and in which the apparatus comprises a spring for moving the said abutment, a latch for holding the abutment against movement by said spring and means for disengaging the latch at the end of the thread-cutting operation of the tool to effect rapid movement of the abutment and collapse of the chasers.

10. In a tap for forming taper threads comprising a tool body; means, comprising a chaser movably mounted on the tool body, for cutting a thread when the tool body and work to be threaded are given relative rotational and axial movements; an outer work-engaging slide operatively mounted for movement on the tool body in the direction of the tool body axis; and means for transmitting relative axial movement of the outer slide and the tool body to the chaser to effect retraction thereof during the thread-cutting operation, said means comprising an inner slide structure mounted in the tool body for axial movement in relation thereto and operatively connected to the chaser, a transverse slide structure operatively mounted for movement in the tool body transversely thereof, cam connections between the outer slide and the transverse slide, and cam connections between the transverse slide and the inner slide, the tap being distinguished by the fact that the said cam connections between the outer slide and the transverse slide comprise a cam member pivotally mounted on the inner side of the outer slide and formed to operatively engage a cam part of the transverse slide and actuating devices carried by the outer slide for adjusting said cam member on its pivotal mounting to different positions corresponding to different thread tapers to be formed by the tap, said adjusting devices acting automatically to hold the pivoted cam member in adjusted position.

11. A tap for forming taper threads as claimed in claim 10 in which the actuating devices for adjusting the cam member on the outer slide constitute a non-overhauling device.

12. A tap for forming taper threads as claimed in claim 10 in which the actuating devices for adjusting the cam member on the outer slide comprise a screw mounted on the outer slide for rotation without endwise movement and a threaded block operatively engaging the threads of the screw and mounted to move endwise of the screw when the latter is rotated.

13. A tap for forming taper threads as claimed in claim 10 comprising means associated with the adjusting means of the pivotally mounted cam for visually indicating different adjustments thereof for causing the tool to cut threads of different specific tapers.

14. In a thread-cutting tap comprising a tool body; thread-forming chasers movably mounted on the front end of the tool body; an inner slide structure supported in the tool body for contracting and expanding the chasers; and an outer slide structure operatively connected with the inner slide structure to move the latter longitudinally of the tool body and comprising a member slidably mounted on the tool body and held against rotation in relation thereto and having a continuous annular portion; the combination therewith of means for supplying lubricating or cooling liquid to the chaser comprising a ring mounted on said annular portion of the outer slide so that the latter can turn in the ring when the ring is held against rotation, one of the two relatively turning parts being formed with an interior annular channel for the lubricating or cooling liquid, a liquid supply conduit connected to said ring in communication with said annular channel, a separately formed ring having one of its front and rear sides formed with a circumferentially extending channel for liquid with a discharge aperture opening radially inward and being attached to the front end of said outer slide member with its channel in communication with the first mentioned channel, and a centrally apertured work-engaging pressure plate secured to the front side of the last named ring.

ALEXANDER F. ROBERTSON.